US009663196B1

(12) United States Patent
Day

(10) Patent No.: US 9,663,196 B1
(45) Date of Patent: May 30, 2017

(54) MARINE VESSEL WITH MOVING CABIN

(71) Applicant: Thomas M Day, Bellingham, WA (US)

(72) Inventor: Thomas M Day, Bellingham, WA (US)

(\*) Notice: Subject to any disclaimer, the term of this patent is extended or adjusted under 35 U.S.C. 154(b) by 0 days.

(21) Appl. No.: 15/178,214

(22) Filed: Jun. 9, 2016

(51) Int. Cl.
*B63B 29/02* (2006.01)
*B63B 3/48* (2006.01)

(52) U.S. Cl.
CPC ............. *B63B 29/02* (2013.01); *B63B 3/48* (2013.01)

(58) Field of Classification Search
CPC .................................. B63B 29/02; B63B 3/48
See application file for complete search history.

(56) References Cited

U.S. PATENT DOCUMENTS

| | | | | |
|---|---|---|---|---|
| 3,634,897 A * | 1/1972 | Cuccio | ............... | B63B 1/08 114/248 |
| 6,298,801 B1 * | 10/2001 | May | ............... | B63B 3/48 114/364 |
| 2001/0025595 A1 * | 10/2001 | Mielke | ............... | B63B 19/18 114/343 |
| 2011/0247538 A1 * | 10/2011 | Gimpel | ............... | B60P 3/1033 114/61.1 |
| 2013/0074752 A1 * | 3/2013 | Chacon | ............... | B63B 15/00 114/39.26 |
| 2014/0000501 A1 * | 1/2014 | Ulgen | ............... | B63B 29/02 114/71 |
| 2014/0076227 A1 * | 3/2014 | Saccenti | ............... | B63B 3/48 114/343 |
| 2014/0165893 A1 * | 6/2014 | O'Neal | ............... | B63B 35/613 114/61.15 |

\* cited by examiner

*Primary Examiner* — Stephen Avila
(74) *Attorney, Agent, or Firm* — Schacht Law Office, Inc.; Dwayne Rogge

(57) ABSTRACT

Disclosed herein is a marine vessel, which in one example comprises a hull with a substantially continuous deck. Also disclosed is a plurality of parallel longitudinally aligned channels extending from the forward deck to the aft deck. The vessel having a vessel cabin resting on and longitudinally movable upon the deck. The vessel cabin having a plurality of rolling wheels attached thereto; wherein the rolling wheels roll upon the deck and allow longitudinal movement of the vessel cabin between the aft region and the forward region. A drive unit (motor) may be provided. The drive unit optionally mounted to the cabin and in one example having a drive wheel mounted to the drive unit and configured to rotate the drive wheel. The drive wheel(s) contacting the deck such that rotation of the drive wheel repositions the cabin longitudinally between the aft region and the forward region.

9 Claims, 3 Drawing Sheets

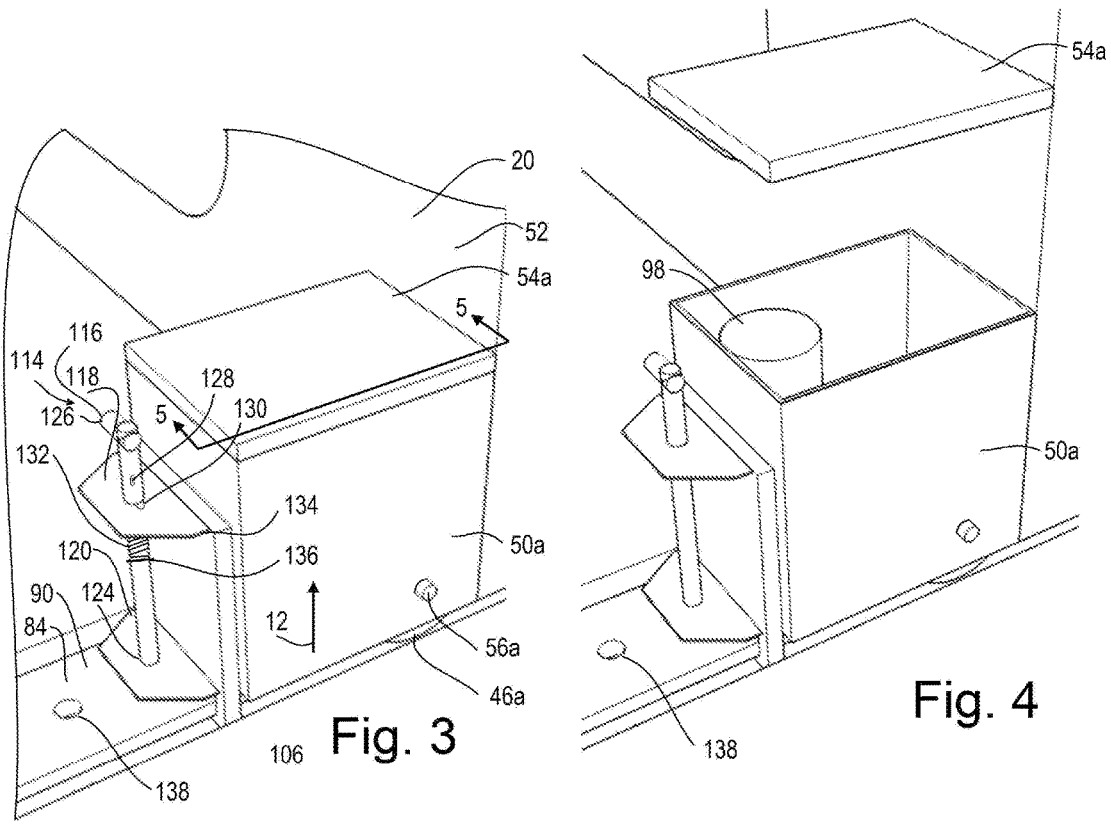
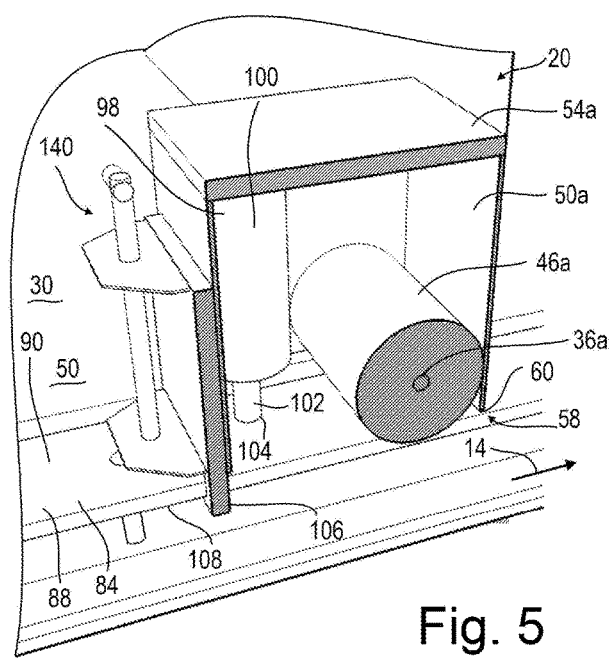

MARINE VESSEL WITH MOVING CABIN

BACKGROUND OF THE DISCLOSURE

Field of the Disclosure

This application relates to the field of marine vessels (boats) that have a cabin (enclosed space for the crew, cargo, or passengers in vehicle).

BRIEF SUMMARY OF THE DISCLOSURE

Disclosed herein is a marine vessel, which in one example comprises a hull with a substantially continuous deck having an upper surface, the deck comprising a forward (bow) region continuous with an aft (stern) region. Also disclosed is a plurality of parallel longitudinally aligned channels extending from the forward deck to the aft deck. The vessel having a vessel cabin resting on and longitudinally movable upon the deck. The vessel cabin having a plurality of rolling wheels attached thereto; wherein the rolling wheels roll upon the deck and allow longitudinal movement of the vessel cabin between the aft region and the forward region. A drive unit (motor) may be provided. The drive unit optionally mounted to the cabin and in one example having a drive wheel mounted to the drive unit and configured to rotate the drive wheel. The drive wheel(s) contacting the deck such that rotation of the drive wheel repositions the cabin longitudinally between the aft region and the forward region.

A latching system is also disclosed, comprising at least one solenoid, mounted to the cabin may be utilized to maintain longitudinal position of the cabin on the deck. In one example, each solenoid has a pressure rod extending therefrom which selectively contacts the deck when the solenoid is actuated. The actuator latches the cabin in position longitudinally relative to the deck. Also disclosed is an example using at least one latch plate mounted to the cabin. Each latch plate having a cantilevered arm extending under the deck; wherein the latch plate hinders vertical and horizontal movement of the cabin relative to the deck; and wherein actuation of the solenoid compresses a portion of the deck between the pressure rod and the cantilevered arm so as to prohibit movement of the cabin relative to the hull.

The marine vessel may further comprise: a T-shaped beam mounted in each channel; and wherein the upper surface of the T-shaped beam is in the plane of the upper surface of the deck.

The marine vessel may be arranged wherein each latch plate extends under both horizontal extensions of the T-shaped beam.

The marine vessel may further comprise a locking system. The locking system in one example comprising: at least one lock pin attached to the cabin so as to be vertically repositioned relative to the cabin; a surface in the deck defining at least one lock pin receiver for each lock pin; and wherein each lock pin engages a lock pin receiver and prohibits horizontal movement of the cabin relative to the deck.

The marine vessel may further comprise a spring biasing the lock pin into the lock pin receiver.

The marine vessel may further comprise a flexible umbilical extending above the deck from the hull to the cabin. The umbilical housing power and/or control conduits from the cabin to a vessel drive and/or steerage mechanism.

The marine vessel may further comprise a surface defining a deck drain extending from each channel through the hull below the upper surface of the deck. In one form, the deck drain extends longitudinally through the transom.

The marine vessel may further comprise a malleable bumper positioned within a forward end of each channel, each malleable bumper configured to mitigate impact of the latch plate with the forward end of the channel.

The marine vessel may further comprise a malleable bumper positioned within a rearward end of each channel, each malleable bumper configured to mitigate impact of the latch plate with the rearward end of the channel.

BRIEF DESCRIPTION OF THE SEVERAL VIEWS OF THE DRAWINGS

FIG. 3 is a detail view of the region 3 of FIG. 1.

FIG. 4 is a view of FIG. 3 with a removable cap lifted to show internal components.

FIG. 5 is a cutaway view taken along line 5-5 of FIG. 3.

DETAILED DESCRIPTION OF THE DISCLOSURE

Figure 1:
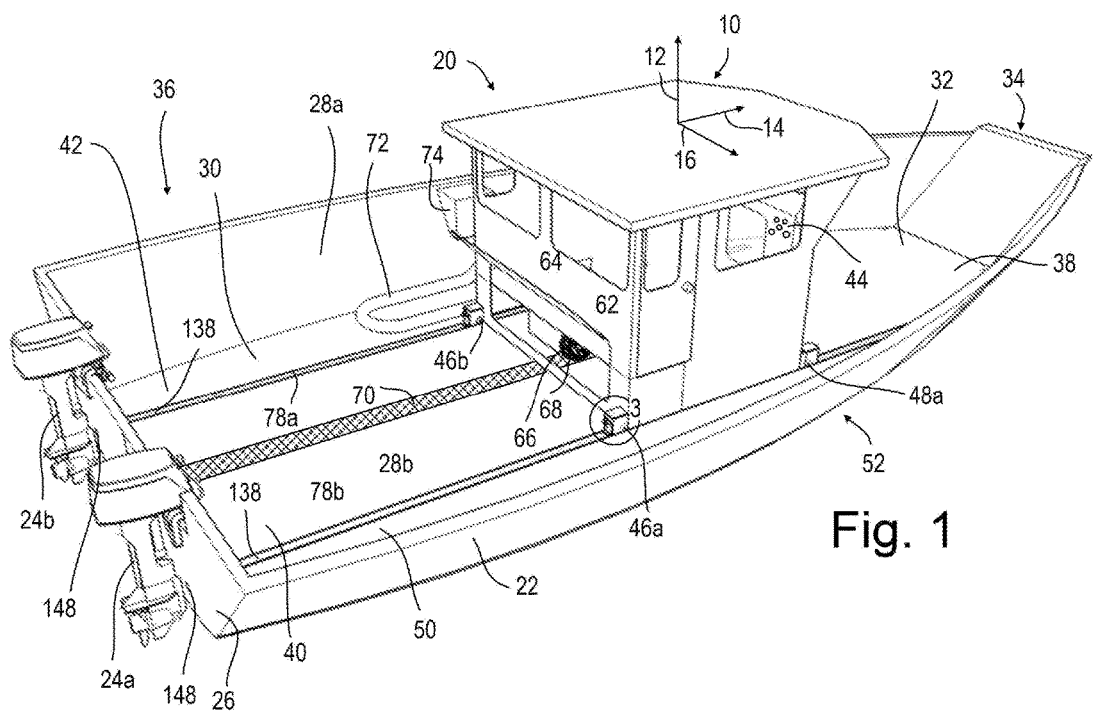
FIG. 1 is a rear isometric view of one example of the disclosed marine vessel with moving cabin in a forward position.

Disclosed herein is a vessel cabin 20 mounted to a marine (boat) hull 22 which floats in water and utilizes one or more propulsion motors 24 (24a and 24b) which in the example shown are outboard motors mounted to the transom 26 of the hull although inboard motors, inboard/outboard motors, sales, or other propulsion methods may also be utilized.

The hull 22 of this example having a port side bulkhead 28a and a starboard side bulkhead 28b. A substantially planar deck 30 extends laterally from the port side bulkhead 28a to the starboard side bulkhead 28b. The deck 30 of this example also extends from the transom 26 to the bow 32 at a forward end 34 of the marine vessel 36. The deck 30 may have attachments thereto such as for example anchor windlasses, access hatches, cleats, winches, blocks, bollards, etc. but it will generally be desired to have the deck 30 free of obstructions. As can be understood by looking to FIG. 1, the longitudinal position of the vessel cabin 20 upon the deck 30 significantly prohibits the amount of unobstructed space on the forward deck region 38 relative to the aft deck region 40. In other terms, a forward positioned cabin 20 reduces the space available on the forward deck 38 and a rearward positioned cabin 20 reduces the space available on the aft deck 40. Previously, a balance has been achieved dependent on the intended use of the vessel. For example, many fishing boats have a forward positioned cabin to provide as much aft deck space as can be achieved with a given hull and cabin size. A forward positioned cabin however may reduce performance (maneuverability) of the vessel. As the vessel floats in water, significant weight in the forward deck 38 may longitudinally pivot the vessel and vertically lift the transom 26 reducing stability of the vessel as it moves through the water and possibly reducing the trust available from the propulsion motors 24. Thus, it is often desired to have a substantial percentage of the weight in the stern 42 or aft region of the vessel so as to improve maneuverability, stability, etc. as the marine vessel 36 moves through the water especially at high speeds where due to the V-shaped hull 22, there is less wetted surface (volume of the hull 22 in the water). Thus, it is often desired to have the cabin 20 as far aft as possible. As the marine vessel 36 moves through the water the vessel pitches forward/aft, and lists (tilts) port to starboard considerably especially in wind, waves, or during active steering movements. Thus, it is often desired to rigidly secure the vessel cabin 20 to the hull 22. In addition, as a control panel 44 is often provided inside the vessel cabin 20 to provide indicators to the operator of the vessel 36 as well as controls to allow the operator to determine and/or adjust functionality of the drive (propulsion) units 24, anchor windlasses, lights, horns, pumps, motor temperature, depth of the water under the vessel, speed of the vessel through the water and other components which require connection of some manner to the hull 22 exterior of the cabin 20 it is generally desired to fix (rigidly mount) the cabin 20 to the hull 22 to facilitate connection between the control panel 44 and the sensors and or components coupled thereto.

Figure 2:
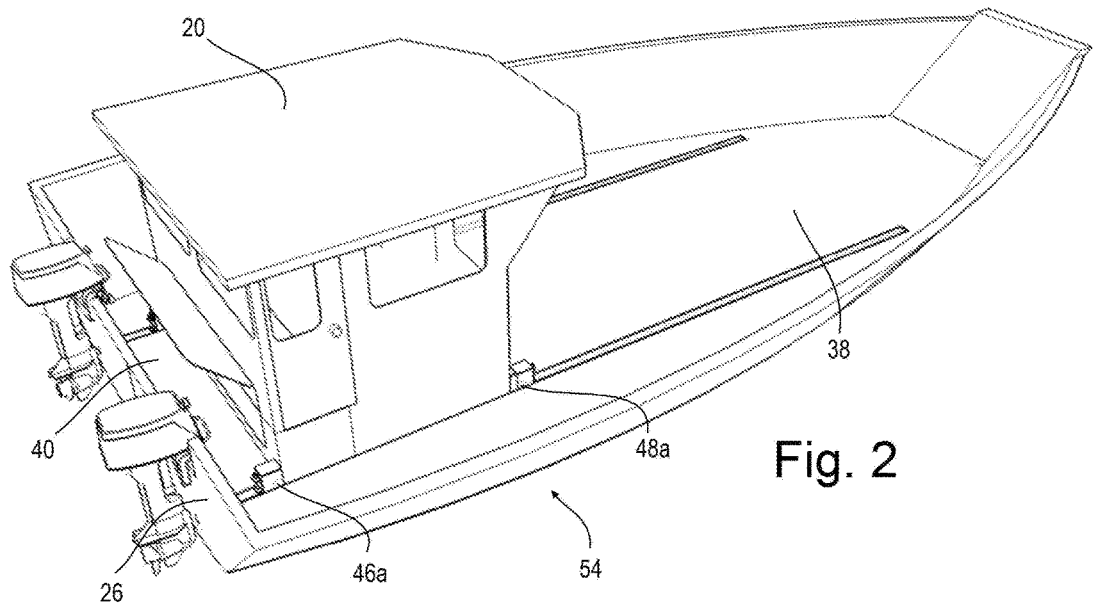
FIG. 2 rear isometric view of one example of the disclosed marine vessel with moving cabin in an aft position.
Figure 6:
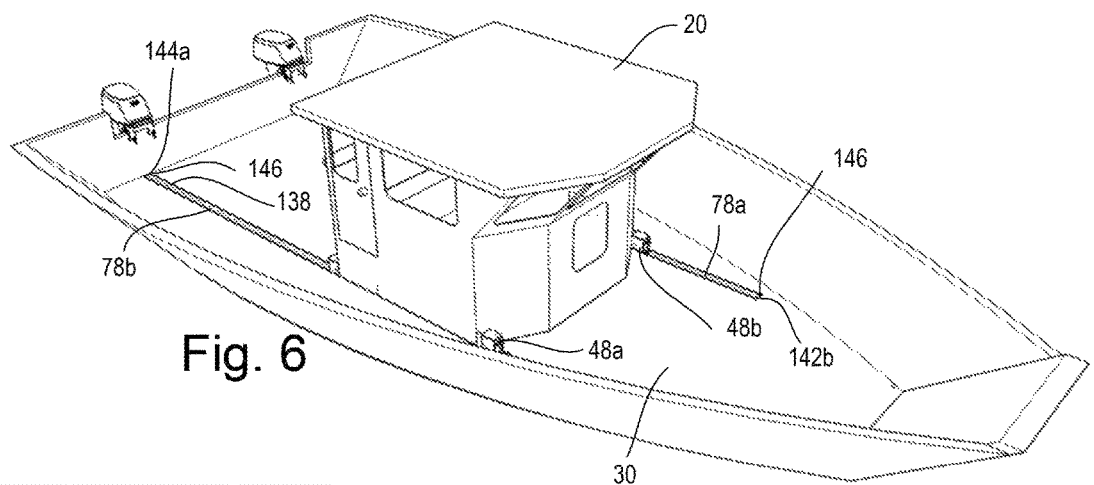
FIG. 6 is a top isometric view of the example of FIG. 1 in a median longitudinal position.
Figure 7:
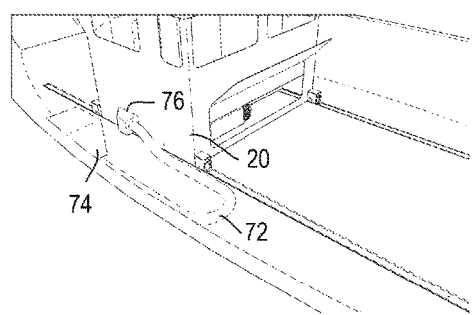
FIG. 7 is a rear isometric view of a region of the example shown in FIG. 1 from the opposing lateral side.
Figure 8:
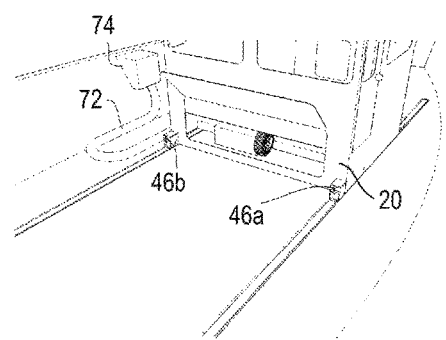
FIG. 8 shows the portions of FIG. 7 from a different angle.

In the example shown in FIG. 1, the vessel cabin 20 utilizes aft roller wheels 46*a* and on the starboard side of the cabin 20 and aft roller wheels 46*b* on the port side of the cabin 20. Likewise, as can be seen in FIG. 6, the vessel cabin 20 utilizes forward roller wheels 48*a* on the starboard side of the cabin 20 and forward roller wheels 48*b* on the port side of the cabin 20. These rollers of this example roll upon the upper surface of the deck 30 and allow longitudinal 14 movement of the vessel cabin 20. For example, FIG. 1 shows the vessel 36 in a substantially forward position 52 whereas FIG. 2 shows the vessel cabin 20 in a substantially aft position. This position shown in FIG. 2 maximizes the space available in the forward deck region 38 and thus minimizes the space available in the aft deck region 40.

Looking to FIG. 3 is shown a detail view of the region 3 of FIG. 1. In this view, a roller/actuator housing 50*a* is shown attached to the aft surface 52 of the vessel cabin 20. The housing 50*a* of this example having a removable cap 54*a* allowing access to the components therein. Looking to FIG. 5 (which is a sectional view taken along line 5-5 of FIG. 3) can be seen the roller 46 attached inside the housing 50*a* and having an axle 56*a* to facilitate rolling of the roller wheel 46*a* upon the upper surface 50 of the deck 30.

The housing 50 including removable cap 54 protecting the roller wheel 46 as well as protecting personnel and cargo upon the deck 30 from accidentally pinching between the roller wheels and the deck 30. As shown, a very slight gap 58 remains between the lower edge 60 of the vessel cabin 20 and the upper surface 50 of the deck 30. This gap 58 allowing freedom of movement of the vessel cabin 20 without scraping or rubbing against the deck 30 as the cabin is repositioned longitudinally 14 upon the deck 30.

In one form, the vessel cabin 20 may be repositioned longitudinally by an operator (person) pushing and or pulling on the vessel cabin 20. In another example, a drive unit 62 which in one example utilizes an electric motor 64, hydraulic actuator, pneumatic actuator, or similar device to provide motive force to at least one drive wheel 66, commonly having a tire 68 thereon which rides upon the upper surface 50 of the deck 30. The drive wheel 66 of this example independent of the roller wheels 46/In one example, the drive unit 62 is actuated by the control panel 44 or may alternatively be operated from the hull 22 or by way of a boat control held by a user. As the drive unit 62 is actuated, rotating the drive wheels 66 the vessel cabin 20 is moved longitudinally 14.

In one example, additional traction may be required between the drive wheel 66 and the deck 30. Thus, in one example, a tire runner 70 is provided affixed to the deck 30 and providing additional traction to the drive wheel 66.

As the connections between the control panel 44 and the components within the hull 22 commonly require a wire and/or fluid conduit connecting the two, a hollow tubular conduit umbilical 72 is provided having a first end 74 (umbilical hull entry) attached to the hull 22 and a second end 76 (umbilical cabin entry) attached to the vessel cabin 20. Additional connections may be required such as between the motors 24 and the cabin 20, between storage batteries and the cabin 20 especially the motor 64, and fluid conduits also may be desired such as to provide water, coolant, hydraulic fluid, or other fluids to or from the vessel cabin 20 from storage tanks for to vessel through hull fittings, etc. through the umbilical 72. In one form, the umbilical 72 is a length of flexible hose which is circumferentially rigid such that a user stepping thereupon will not damage any wires or conduits therein however; movement of the vessel cabin 20 longitudinally will not kink, sharply bend, or sever the wires/conduits within the umbilical 72. In one example, flexible corrugated pipe is used such as the PVC (polyvinyl chloride) pipe commonly used in yard drainage systems may be utilized for the umbilical 72. As only the ends are attached, the remaining portions slide upon the deck as the cabin 20 repositions longitudinally.

This umbilical positioned above the deck and in one example resting upon the deck eliminates any fixed deck obstructions, such as channels, hatches, and outlets in the deck 30 otherwise needed for passage of the fluid hoses and electric wires between the cabin and the hull.

Once the desired longitudinal position of the vessel cabin 20 is achieved on the deck 30, it will be desired to maintain this position. Although other securement devices and methods can be utilized, a latching system and a locking system are disclosed herein to maintain the position of the vessel cabin 20 at a desired longitudinal position.

Figure 9:
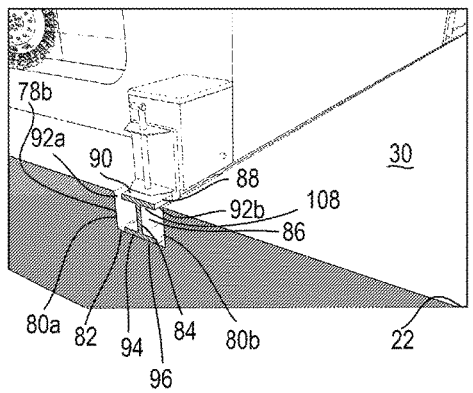
FIG. 9 is a cutaway view of the example shown in FIG. 3.

Looking to FIG. 9 is shown an example wherein a vertically recessed channel 78 is provided at port and starboard sides of the deck 30. The port channel 78*a* and starboard channel 78*b* are generally mirror images of each other and are aligned parallel to each other and substantially aligned with the longitudinal axis 10 of the vessel. As can be seen more clearly in FIG. 9, each channel 78 comprises vertical walls 80 extending downward from the upper surface 50 of the deck 30 and having a lower surface 82 extending thereacross. A T-shaped structure 84 having a vertical extension 86 extending from the lower surface 82 of the channel 78 is shown. The T-shaped structure 84 having a horizontal cross member 88 with an upper surface 90. In one example, the upper surface 90 of the T-shaped structure is substantially in the same plane as the upper surface 50 of the deck 30 so as to provide little or no obstruction to the deck 30. As shown, a gap 92 is provided on one or both lateral sides of the horizontal cross member 88 to allow for passage of part of a latching system to be described. In the specific example of FIG. 9, the T-shaped structure 84 further comprises a lower horizontal cross member 94 thus forming the T-shaped portion into an I-beam 96.

Movement of the vessel cabin 20 upon the deck 30 has been described. As securement of the vessel cabin 20 is often desired, a latching system and a separate locking system will be described. The latching system is provided for ease in securing the vessel cabin 20 at any (non-indexed) desired longitudinal position along the channels 78. The locking system is provided for a more secure (indexed) system for securing the vessel cabin 20 along the channels 78.

Figure 10:
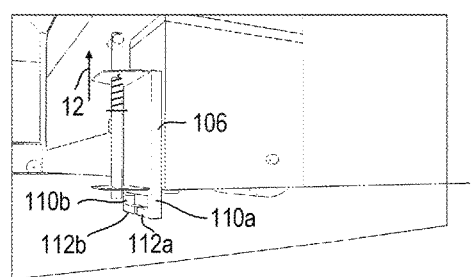
FIG. 10 is a view of the example shown in FIG. 3 with the deck, channel, and T-shaped portion removed to show the remaining components.

Looking to FIG. 5, a latch solenoid 98 is shown attached to the vessel cabin 20 inside the actuator housing 50. The solenoid 98 comprising an actuator 100 and a pressure rod 102. The pressure rod 102 having a contact end 104 which contacts and pushes (presses) against the upper surface 90 of the T-shaped portion 84 or surface of the deck 30 with sufficient force to maintain the vessel cabin 20 in place on the deck 30. In one form, the solenoid provides sufficient pressure to move at least a portion of the cabin 20 vertically upwards away from the deck 30. This vertical movement then drives a latch plate 106 (securely mounted to at least one roller/actuator housing 50) into contact with the underside 108 of the horizontal cross member 88 and thus securely engages the cabin in longitudinal position upon the deck 30. Looking to FIG. 10, it can be seen that in this example, the latch plate 106 has a plurality of vertically downward extending portions 110 (a and b) which also serve to prohibit lateral movement of the cabin 20 relative to the deck 30 as these downward extending portions 110 engage the lateral sides of the horizontal cross member 88. Also shown are a plurality of horizontal portions 112 (a and b) which extend under the horizontal cross member 88 and contact the underside 108 of the horizontal cross member when the latch solenoid 98 is actuated.

As the latch solenoid 98 is released, the pressure rod 102 moves away from the deck 30, the cabin is free to reposition longitudinally by way of the roller wheels 46 etc.

Looking to FIG. 3 is shown example of a locking system 114. In this example, the locking system 114 is attached (mounted) to the roller/actuator housing 50 although it may alternatively be attached to other components or surfaces of the vessel cabin 20. The locking system 114 of this example comprising a lock pin 116 which passes through an upper lock pin plate 118 and lower lock pin plate 120. Each lock pin plate having a surface defining a void (122 and 124) there through to allow vertical movement of the lock pin 116 relative to the lock plates 118 and 120. The lock pin 116 in this example comprising a user engagement surface 126 which allows a user to easily grasp the lock pin 116 and reposition it vertically upward 12, away from the upper surface 90 of the T-shaped portion 84 to release the locking system 114. When released, (assuming the latching system is also released), the vessel cabin 20 is free to be repositioned longitudinally along the deck 30. A protrusion 128 may be so sized and configured to pass through a surface defining an opening 130 in either lock plate when rotationally aligned. When rotationally offset, the protrusion 128 contacts the lock plate and prohibits vertical repositioning.

In one form, a downward biasing spring 132 may be provided. In one example the spring 132 is a compression spring extending from the underside 134 of either the upper lock plate 118 or the lower lock plate 120 and engaging a surface 136 such as a ring, protrusion, or step in the lock pin 116. A compression spring in this position would bias the lock pin 116 downward especially were protrusion 128 aligned with the opening 130.

To utilize the locking system 114, the vessel cabin 20 is repositioned longitudinally such that at least one lock pin 116 is aligned with a lock pin receiver 138. In example shown, the lock pin receiver 138 is a surface defining a (cylindrical) hole in the upper surface 90 of the T-shaped portion 84. Once these components are so aligned, the lock pin 116 may be repositioned downward so as to be inserted into the lock pin receiver 138 further prohibiting longitudinal movement of the vessel cabin 20 relative to the deck 30.

As can be seen in FIG. 1, lock pin receivers 138 may operate in laterally opposed pairs.

The locking system 114 may be utilized in conjunction with (simultaneously with) the latching system 140 previously described.

In one example the indexed locking system may utilize lock pin receivers 138 at specific desired longitudinal positions along the deck 30. For example, as it is often desired to have the vessel cabin 20 at an aft position as shown in FIG. 2, a plurality of lock pin receivers 138 (see FIG. 1) are provided. This position allowing a maximum amount of unobstructed forward deck space 38 and in some hull configurations maximum maneuverability at high-speed. Other lock pin receivers may be placed to coincide with a full forward position of the cabin 20 and intermediate positions.

As the vessel cabin 20 rolls forward and aft, it will be desired in some examples to provide a shock absorbing structure at the forward end 142 and rearward end 144 of each channel 78. In one example, a malleable bumper 146 may be positioned below the deck 30 at each longitudinal end (142/144) of each channel 78. Each malleable bumper 146 may be composed of closed cell foam, polymer, rubber, plastic, wood, etc. and combinations thereof. The malleable bumper 146 will engage the downward protruding portion of the latch plate 106 or other component of the cabin extending into each channel 78.

In addition, as water and other fluids often accumulate on an open deck 30 either from wind, waves, rain, spillage, etc., a deck drain 148 may be provided as shown in FIG. 1 comprising a surface defining a void through the transom 26 and fluidly coupling with each channel 78 so as to drain each channel 78 through the transom 26 without the requirement of a pump or other apparatus. A flapper valve or similar structure may be provided in each deck drain 148 to reduce the amount of back flow through the deck drain 148 as is commonly known in the art. This arrangement allows the laterally and vertically open region of each channel 78 to form a fluid conduit, open at the top, for fluids to drain off of the deck and out of the vessel.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

The invention claimed is:
1. A water vessel comprising:
   a hull with a substantially continuous deck having an upper surface, the deck comprising a forward region continuous with an aft region;
   a plurality of parallel longitudinally aligned channels extending from the forward deck to the aft deck;
   a vessel cabin resting on the deck;
   the vessel cabin having a plurality of rolling wheels attached thereto;

wherein the rolling wheels roll upon the deck and allow longitudinal movement of the vessel cabin between the aft region and the forward region;

a drive unit mounted to the cabin and having a drive wheel mounted to the drive unit and configured to rotate the drive wheel;

the drive wheel contacting the deck such that rotation of the drive wheel repositions the cabin longitudinally between the aft region and the forward region;

a latching system comprising;
   at least one solenoid mounted to the cabin;
   each solenoid having a pressure rod extending therefrom and selectively contacting the deck when the solenoid is actuated;
   at least one latch plate mounted to the cabin;
   the latch plate having a cantilevered arm extending under the deck;
   wherein the latch plate hinders vertical and horizontal movement of the cabin relative to the deck; and
   wherein actuation of the solenoid compresses a portion of the deck between the pressure rod and the cantilevered arm so as to prohibit movement of the cabin relative to the hull.

2. The water vessel as recited in claim 1 further comprising:
   a T-shaped beam mounted in each channel; and
   the upper surface of the T-shaped beam is in the plane of the upper surface of the deck.

3. The water vessel as recited in claim 2 wherein the latch plate extends under both horizontal extensions of the T-shaped beam.

4. The water vessel as recited in claim 1 further comprising a locking system comprising:
   at least one lock pin attached to the cabin so as to be vertically repositioned relative to the cabin;
   at least one surface in the deck defining at least one lock pin receiver for each lock pin; and
   wherein each lock pin engages a lock pin receiver and prohibits horizontal movement of the cabin relative to the deck.

5. The water vessel as recited in claim 1 further comprising a spring biasing the lock pin into the lock pin receiver.

6. The water vessel as recited in claim 1 further comprising a flexible umbilical extending from the hull to the cabin housing power and/or control conduits from the cabin to a vessel drive and/or steerage mechanism.

7. The water vessel as recited in claim 1 further comprising a surface defining a deck drain extending through the hull into each channel below the upper surface of the deck.

8. The water vessel as recited in claim 1 further comprising a malleable bumper positioned within a forward end of each channel, each malleable bumper configured to mitigate impact of the latch plate with the forward end of the channel.

9. The water vessel as recited in claim 1 further comprising a malleable bumper positioned within a rearward end of each channel, each malleable bumper configured to mitigate impact of the latch plate with the rearward end of the channel.

* * * * *